US011449465B2

(12) United States Patent
Yin et al.

(10) Patent No.: US 11,449,465 B2
(45) Date of Patent: Sep. 20, 2022

(54) FIXED CHUNK SIZE DEDUPLICATION WITH VARIABLE-SIZE CHUNKING

(71) Applicant: International Business Machines Corporation, Armonk, NY (US)

(72) Inventors: Wen Bao Yin, Shanghai (CN); Yicheng Feng, Shanghai (CN); You Miao Zhang, Shanghai (CN); Ao Qiong Li, Shanghai (CN); Shan Shan Zhao, Shanghai (CN); Wei Li, Shanghai (CN); Kun Peng Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 16/568,037

(22) Filed: Sep. 11, 2019

(65) Prior Publication Data

US 2021/0073178 A1    Mar. 11, 2021

(51) Int. Cl.
   *G06F 16/13*    (2019.01)
   *G06F 16/174*   (2019.01)
   *G06F 3/06*     (2006.01)

(52) U.S. Cl.
   CPC ............ *G06F 16/137* (2019.01); *G06F 3/067* (2013.01); *G06F 3/0608* (2013.01); *G06F 3/0641* (2013.01); *G06F 16/1752* (2019.01)

(58) Field of Classification Search
   CPC .. G06F 16/137; G06F 16/1752; G06F 3/0608; G06F 3/0641; G06F 3/067
   USPC ........................................................ 707/692
   See application file for complete search history.

(56) References Cited

U.S. PATENT DOCUMENTS

| 8,234,468 | B1   | 7/2012  | Deshmukh et al. |               |
|-----------|------|---------|-----------------|---------------|
| 9,128,951 | B1 * | 9/2015  | Agrawal         | G06F 16/1752  |
| 9,411,815 | B1 * | 8/2016  | Lu              | G06F 11/1453  |
| 9,465,808 | B1   | 10/2016 | Karr et al.     |               |
| 10,324,805| B1 * | 6/2019  | Patwardhan      | G06F 11/1451  |
| 2008/0133561 | A1 * | 6/2008 | Dubnicki      | H04L 65/4084  |
| 2008/0159331 | A1 * | 7/2008 | Mace          | H04L 47/27    |
|           |      |         |                 | 370/473       |

(Continued)

OTHER PUBLICATIONS

Xia et al., "FastCDC: a Fast and Efficient Content-Defined Chunking Approach for Data Deduplication," Proceedings of the USENIX Annual Technical Conference (USENIX ATC '16), Jun. 22-24, 2016, pp. 101-114.
Defenders et al., "High-speed Rolling Hash chunking for Content-Aware Data Deduplication," IP.com Prior Art Database, Technical Disclosure No. IPCOM000225908D, Mar. 12, 2013, 3 pages.
Muthitacharoen et al., "A Low-bandwith Network File System," ACM, SOSP '01, 2001, pp. 174-187.

(Continued)

*Primary Examiner* — Hosain T Alam
*Assistant Examiner* — Nicholas E Allen
(74) *Attorney, Agent, or Firm* — Zilka-Kotab, P.C.

(57) ABSTRACT

A computer-implemented method includes positioning a sliding window over a string of data and calculating a hash value using a rolling hash function for data encompassed by the sliding window. The method includes determining whether the calculated hash value for the data encompassed by the sliding window matches the value of an element in a cut point candidate (CPC) array by comparing the calculated hash value to the value of a first element in the CPC array. In response to the calculated hash value being equal to the value of the first element in the CPC array, the method includes defining an index of the sliding window as the cutting point for a data block.

20 Claims, 6 Drawing Sheets

(56) References Cited

U.S. PATENT DOCUMENTS

| | | | | |
|---|---|---|---|---|
| 2012/0150954 | A1* | 6/2012 | Tofano | G06F 9/5066 |
| | | | | 709/204 |
| 2012/0158672 | A1* | 6/2012 | Oltean | G06F 16/13 |
| | | | | 707/692 |
| 2014/0095439 | A1* | 4/2014 | Ram | G06F 3/067 |
| | | | | 707/640 |
| 2015/0186407 | A1* | 7/2015 | Xu | G06F 16/1873 |
| | | | | 707/638 |
| 2015/0347445 | A1 | 12/2015 | Zhu | |
| 2016/0188589 | A1* | 6/2016 | Guilford | G06F 16/1748 |
| | | | | 707/692 |
| 2016/0335024 | A1* | 11/2016 | Zhong | G06F 3/0605 |
| 2016/0350301 | A1* | 12/2016 | Tripathy | G06F 40/205 |
| 2017/0131934 | A1* | 5/2017 | Kaczmarczyk | G06F 3/0673 |
| 2017/0242615 | A1* | 8/2017 | Mayo | G06F 3/0608 |
| 2017/0286233 | A1* | 10/2017 | Dain | G06F 16/24568 |
| 2018/0165345 | A1* | 6/2018 | Nomura | G06F 11/1453 |
| 2019/0258637 | A1* | 8/2019 | Bhattacharjee | G06F 16/24549 |

OTHER PUBLICATIONS

Moinakg, "High Performance Content Defined Chunking," Wordpress, Jun. 22, 2013, 10 pages, retrieved from https://moinakg.wordpress.com/2013/06/22/high-performance-content-defined-chunking/.

Yu et al., "Leap-based Content Defined Chunking-Theory and Implementation," IEEE, 2015, 12 pages, retrieved from http://storageconference.us/2015/Papers/17.Yu.pdf.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

* cited by examiner

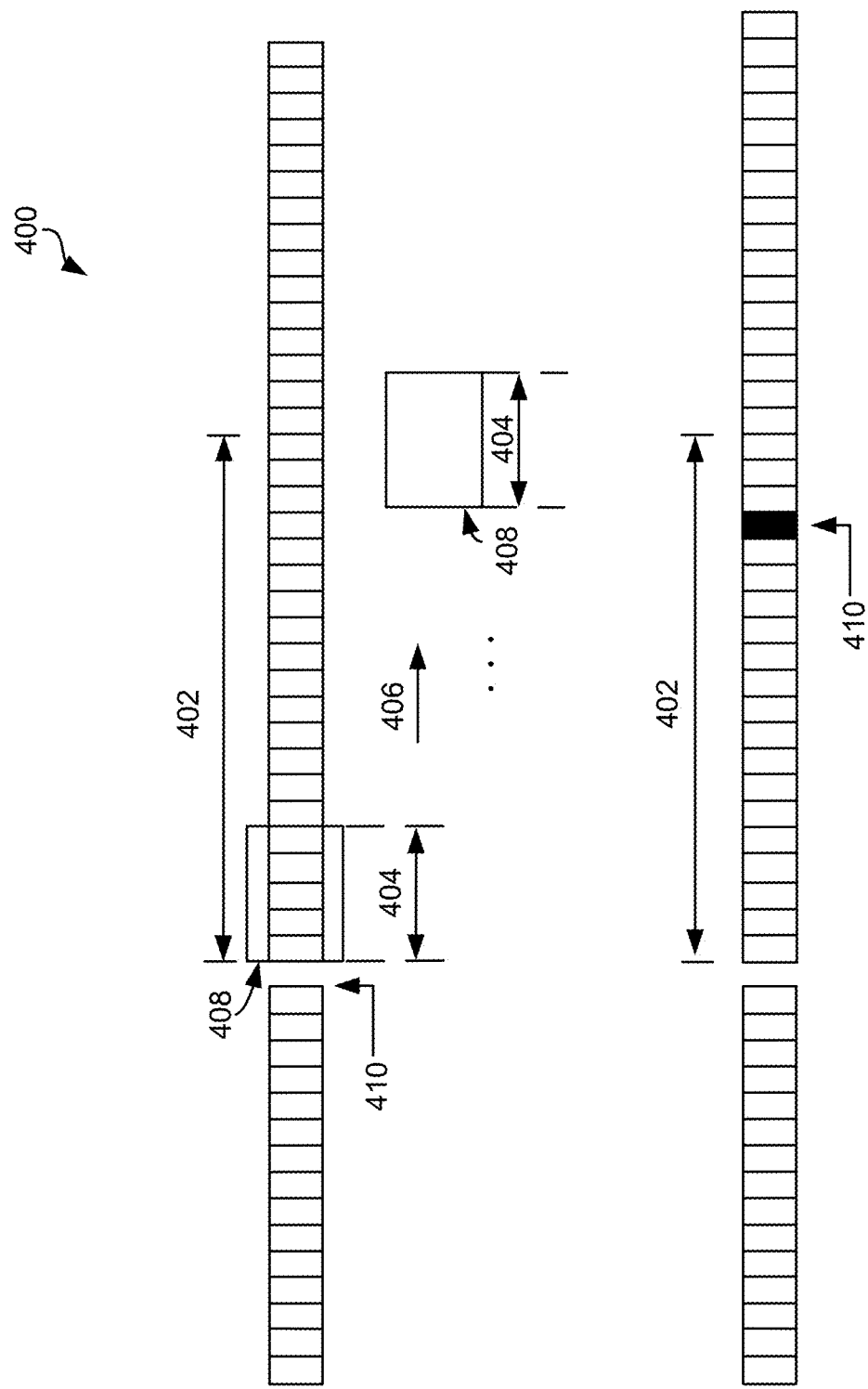

FIXED CHUNK SIZE DEDUPLICATION WITH VARIABLE-SIZE CHUNKING

BACKGROUND

The present invention relates to deduplication, and more particularly, this invention relates to a variable-size chunking algorithm for fixed chunk size deduplication in cloud storage systems and networks.

Deduplication includes replacing duplicate chunks of data across a system with pointers to a single instance of the data, thereby avoiding the storage space required to store multiple instances of duplicate data. In traditional storage systems having deduplication capabilities, as new data is added to the storage system, the new data is compared with existing data within the storage system. If portions of the new data already exist in the storage system, the duplicate portions of data are not written to storage system; rather only the unique data is stored to storage of the storage system, and the aforementioned pointer is written in place of the duplicate portions.

BRIEF SUMMARY

A computer-implemented method, according to one embodiment, includes positioning a sliding window over a string of data and calculating a hash value using a rolling hash function for data encompassed by the sliding window. The method includes determining whether the calculated hash value for the data encompassed by the sliding window matches the value of an element in a cut point candidate (CPC) array by comparing the calculated hash value to the value of a first element in the CPC array. In response to the calculated hash value being equal to the value of the first element in the CPC array, the method includes defining an index of the sliding window as the cutting point for a data block. In response to the calculated hash value being greater than the value of the first element in the CPC array, the method includes sequentially comparing the calculated hash value for the data encompassed by the sliding window to the sequential elements in the CPC array. In response to the calculated hash value being equal to the value of one of the sequential elements in the CPC array, the method includes defining the index of the sliding window as the cutting point for the data block. In response to the calculated hash value being less than the value of the first element in the CPC array, the method includes storing the calculated hash value to a temporary hash value array, positioning the sliding window in a second position a step length from a first edge of the sliding window, and calculating a second hash value using the rolling hash function for data encompassed by the sliding window in the second position. The method includes comparing the second hash value for the data encompassed by the sliding window to the value of the first element in the CPC array. In response to the second calculated hash value being equal to the value of the first element in the CPC array, the method includes defining the index of the sliding window as the cutting point for the data block. In response to defining the index of the sliding window as the cutting point for the data block, the method includes positioning the sliding window the step length from the first edge of the sliding window and repeating the calculating and determining operations sequentially until the sliding window encompasses the end of the string of data, wherein the data blocks are defined by the cutting points.

A computer program product for defining data blocks within a string of data, according to one embodiment, includes a computer readable storage medium having program instructions embodied therewith. The program instructions are executable by a computer to cause the computer to perform the foregoing method.

A system, according to one embodiment, includes a processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4B is an exemplary implementation of the method of FIG. 3 in accordance with one embodiment of the present invention.

DETAILED DESCRIPTION

Figure 1:
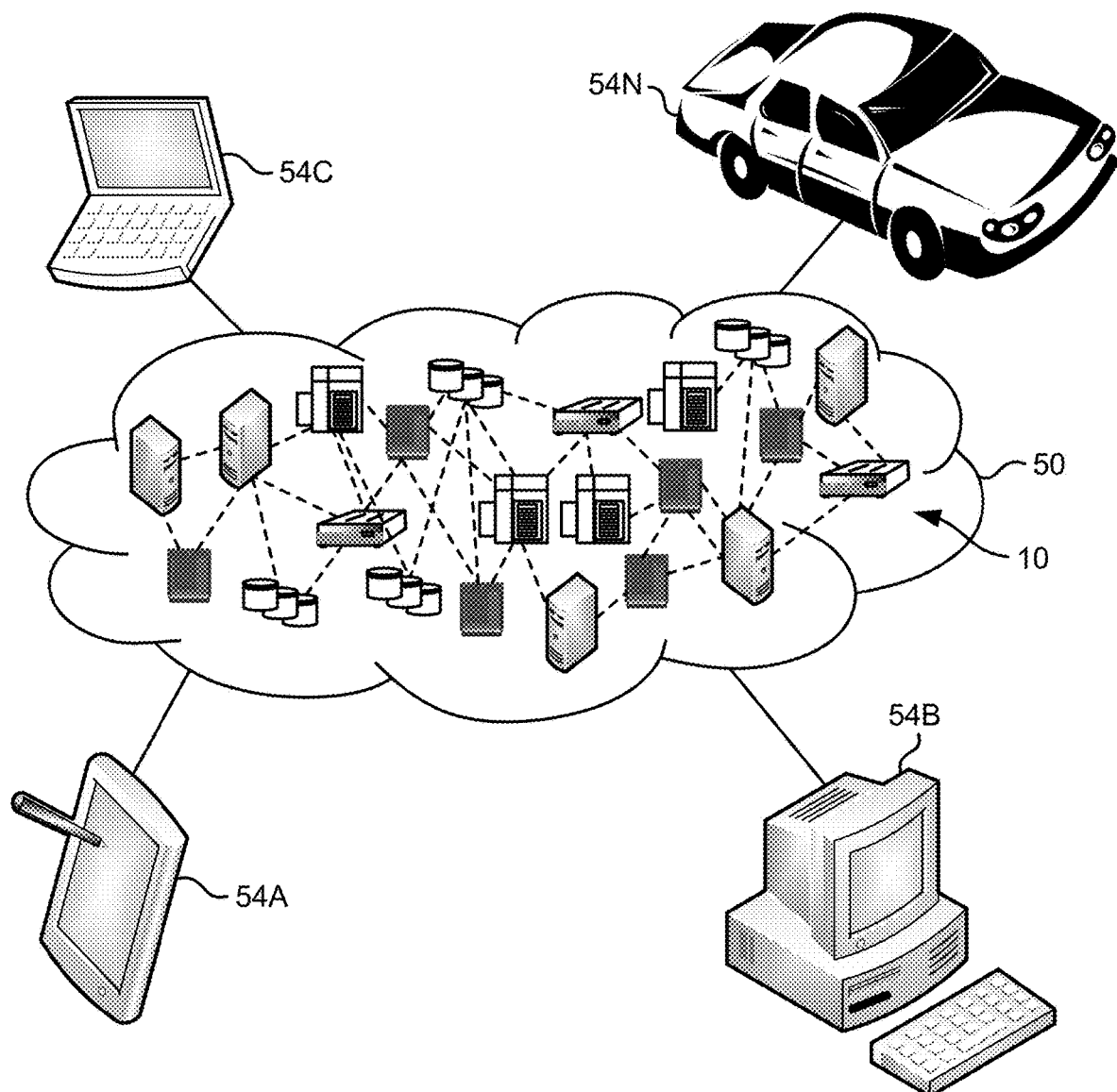
FIG. 1 depicts a cloud computing environment in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of a variable-sized chunking algorithm for fixed chunk size deduplication.

In one general embodiment, a computer-implemented method includes positioning a sliding window over a string of data and calculating a hash value using a rolling hash function for data encompassed by the sliding window. The method includes determining whether the calculated hash value for the data encompassed by the sliding window matches the value of an element in a cut point candidate (CPC) array by comparing the calculated hash value to the value of a first element in the CPC array. In response to the calculated hash value being equal to the value of the first element in the CPC array, the method includes defining an index of the sliding window as the cutting point for a data block. In response to the calculated hash value being greater than the value of the first element in the CPC array, the method includes sequentially comparing the calculated hash value for the data encompassed by the sliding window to the sequential elements in the CPC array. In response to the calculated hash value being equal to the value of one of the sequential elements in the CPC array, the method includes defining the index of the sliding window as the cutting point for the data block. In response to the calculated hash value being less than the value of the first element in the CPC array, the method includes storing the calculated hash value to a temporary hash value array, positioning the sliding window in a second position a step length from a first edge of the sliding window, and calculating a second hash value using the rolling hash function for data encompassed by the sliding window in the second position. The method includes comparing the second hash value for the data encompassed by the sliding window to the value of the first element in the CPC array. In response to the second calculated hash value being equal to the value of the first element in the CPC array, the method includes defining the index of the sliding window as the cutting point for the data block. In response to defining the index of the sliding window as the cutting point for the data block, the method includes positioning the sliding window the step length from the first edge of the sliding window and repeating the calculating and determining operations sequentially until the sliding window encompasses the end of the string of data, wherein the data blocks are defined by the cutting points.

In another general embodiment, a computer program product for defining data blocks within a string of data includes a computer readable storage medium having program instructions embodied therewith. The program instructions are executable by a computer to cause the computer to perform the foregoing method.

In one general embodiment, a system includes a processor and logic integrated with the processor, executable by the processor, or integrated with and executable by the processor. The logic is configured to perform the foregoing method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
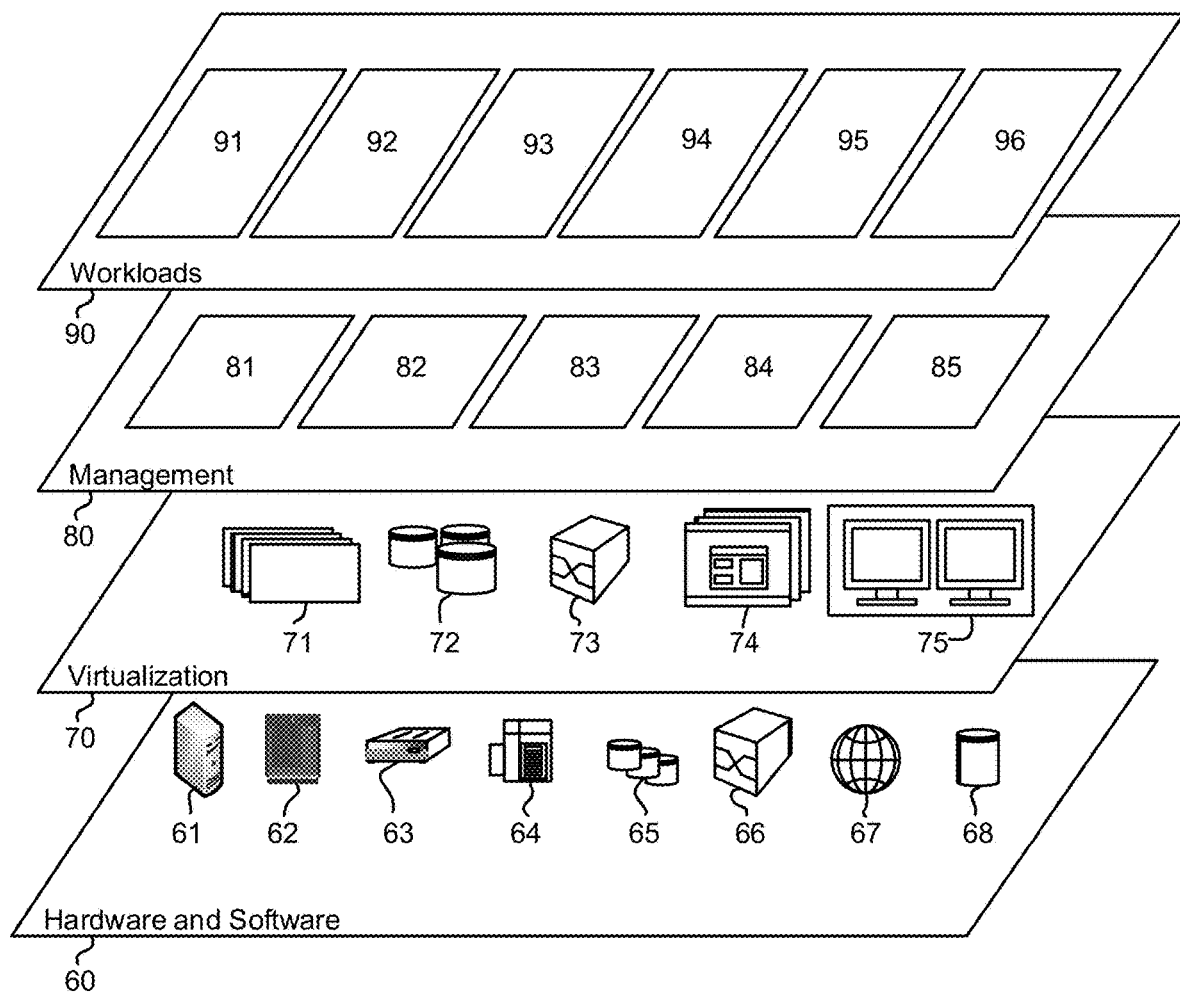
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and variable-sized chunking for fixed chunk size deduplication 96.

Conventional methods for deduplication partitioning block algorithms include fixed-size partitioning (FSP), content-defined chunking (CDC), sliding block (SB) based duplicated data detection, etc. FSP partitions data into fixed-size chunks wherein each data block is the same length. CDC and SB based duplicated data detection partitions data into variable-sized chunks based on cutting points defined by the SB algorithm.

Conventional FSP techniques are not efficient for storing data with edits. Each instance of data (e.g., each version of the data) must be stored even if the insertions and/or deletions are relatively minor. Conventional CDC and SB techniques also prevent efficient deduplication because each instance of an edited block of data must be stored even though unchanged data blocks may be referenced through deduplication processes.

Various CDC and SB techniques use conventional sliding window techniques and/or rolling hash techniques to determine whether the data encompassed in the window satisfies predefined criteria. If the data (e.g., the calculated hash value associated with the data within the window) does not satisfy the criteria, the window may slide ahead to determine whether the new data satisfies the predefined criteria. In response to determining that the data within the sliding window satisfies the criteria, conventional variable size chunk algorithms define the cutting points in the data. Conventional CDC and SB algorithms are efficient for deduplication of unstructured data and unrelated data because the CDC and SB algorithms store less chunks on systems and achieve higher reduction ratios. However, the size of the sliding window remains constant in conventional CDC and SB algorithms (e.g., for DS8000, the chunk size is 8k). Additionally, selecting an improper step length for moving the sliding window may result in a lower reduction ratio than for FSP because longer or shorter step lengths may be more efficient for different types of data. Chunks with variable sizes are often inefficient for use with other data reduction technologies including various data compression techniques or any other techniques that use fixed-size chunks.

In stark contrast, various operations of the present disclosure adapt variable-sized chunking algorithms to deduplication systems with fixed chunking sizes. Various embodiments disclosed herein improve conventional rolling hash techniques by efficiently adapting the sliding window for different data types, system requirements, etc. At least some of the operations presented herein achieve lower chunk numbers, high reduction ratios, and reduce storage requirements. At least some of the operations disclosed herein improve the efficiency and functionality of a computer by significantly reducing storage requirements, especially where the operations take advantage of variable size data chunking abilities while enabling various data compression techniques or any other techniques that use fixed-size chunks.

Figure 3:
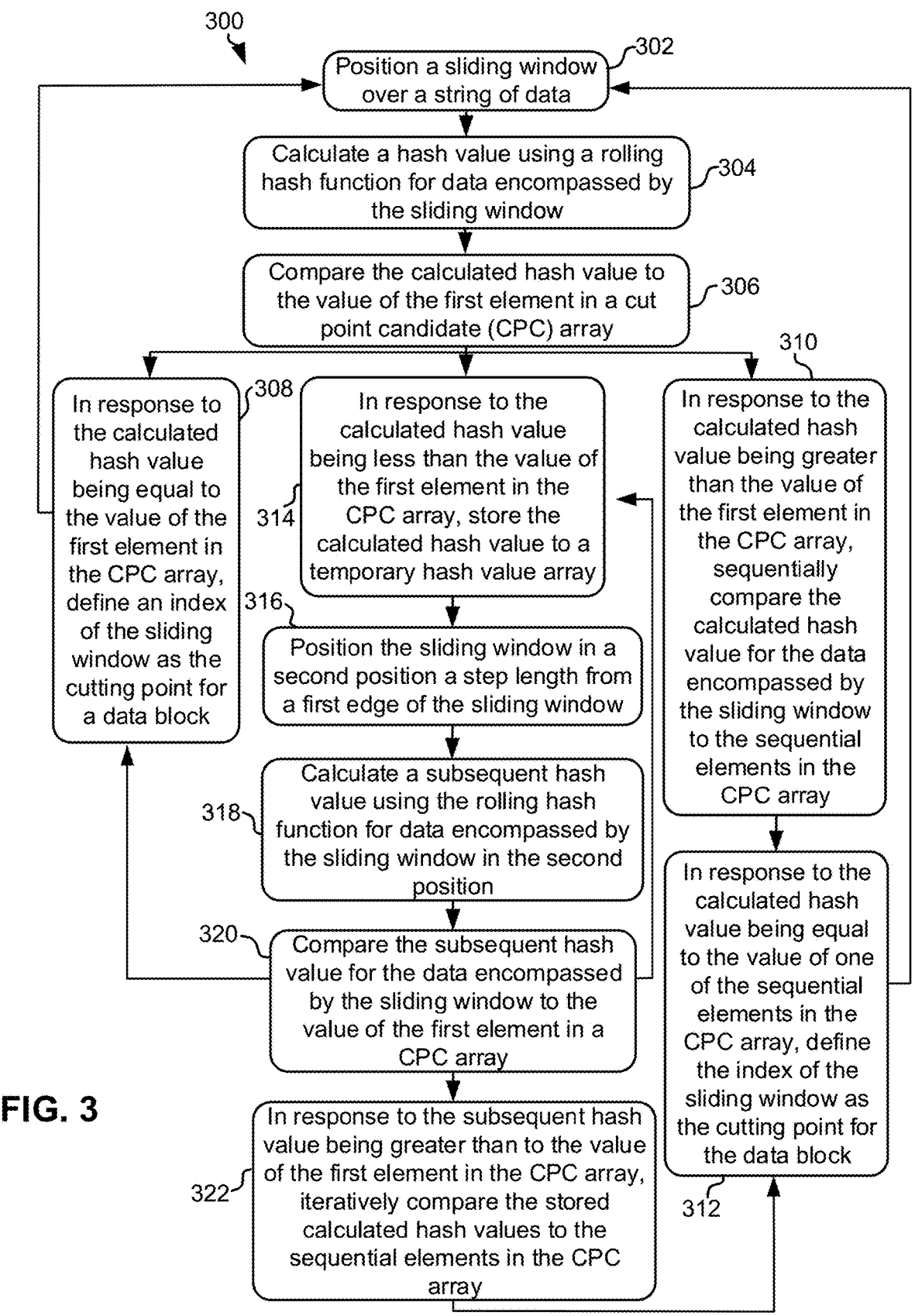
FIG. 3 is a flowchart of a method in accordance with one embodiment of the present invention.

Now referring to FIG. 3, a flowchart of a method 300 is shown according to one embodiment. The method 300 may be performed in accordance with the present invention in any of the environments depicted in FIGS. 1-2 and 4A-5, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 includes operation 302. Operation 302 includes positioning a sliding window. In preferred embodiments, a sliding window may be positioned over at least some data in a string of data as would be understood by one having ordinary skill in the art. The data may be received from the system input/output (10). The data may be received in any manner known in the art. In a preferred approach, the sliding window may be repositioned in response to defining a cutting point for data blocks within the string of data. In a preferred embodiment, the sliding window is initially positioned such that a first edge of the window is at the beginning of the data. The method 300 may reiterate through the various operations described below until the sliding window encompasses the end of the string of data as would be understood by one having ordinary skill in the art upon reading the present disclosure.

In a preferred embodiment, the size of the sliding window is defined by a user, a content provider, a service provider, a manufacturer, a default setting, etc. In one exemplary embodiment, the size of the sliding window is 32 bits. In another exemplary embodiment, the size of the sliding window is 48 bits. In a preferred embodiment, the size of the sliding window is based on the type of data, the application, the system requirements, etc. In various embodiments, the size of the sliding window may be experimentally determined. For example, a variety of sizes for the sliding window may be used over a relatively small portion of data to determine a preferred window size for a particular use case.

In various embodiments, positioning the sliding window includes sliding the sliding window at least one step length from a previous cutting point. Positioning the sliding window may include sliding the sliding window at least one step length from a current location of a first edge of the sliding window. An initial step length of the sliding window may be received from the system input/output (IO), an application, etc. In a preferred embodiment, the step length is based on the type of data, the application, the system requirements, etc. In various embodiments, the step length may be experimentally determined. For example, a variety of sizes for the step length may be used over a relatively small portion of data to determine a step length for a particular use case. In one exemplary embodiment, a step length is 16 bits.

In a preferred approach, the method 300 chunks the data string into data blocks of variable sizes which are substantially similar to a predefined fixed chunk size and/or within a predefined threshold of the predefined fixed chunk size. Substantially similar sizes may be based on a predefined threshold in at least some approaches. For example, a data block which is substantially similar in size to a predefined fixed chunk size may include data blocks within 5 bits, 10 bits, 15 bits, 20 bits, etc., of the predefined fixed chunk size. The predefined fixed chunk size and/or a predefined threshold may be based on the storage system used to store the data, the type of data, etc. The predefined fixed chunk size and/or a predefined threshold may be determined by a user, a manufacturer, a content provider, a service provider, a default setting, etc. Any predefined value disclosed herein may be found in a look-up table.

In a preferred embodiment, a cutting point candidate (CPC) array may be used in various operations to determine the cutting points of the data blocks. The data blocks may be defined by at least 2 pointers. In one approach, the first pointer for the data block is the index of the sliding window (e.g., the beginning of the sliding window and/or the previous cutting point defined by the operations described herein) and the second pointer is the end of the data block (e.g., the previous cutting point).

The CPC array may store candidate cutting points (e.g., elements) according to a priority order in a preferred embodiment. In some embodiments, elements may comprise encodings corresponding to the period, the comma, punctuation, conjunctions, bullet points, symbols, characters, etc. Any elements may be predefined by a user, a content provider, a service provider, default settings, etc. Any elements may be found in a look up table. The values of the elements may be compared to the calculated hash value of the data encompassed by the sliding window (to be described in detail below) to determine the cutting points such that the size of the data blocks are substantially similar to the predefined fixed chunk size. The elements of the CPC array may be associated with the type of data in at least some embodiments.

The following operations of method 300 operations for determining whether the calculated hash value for the data encompassed by the sliding window matches the value of an element in a cut point candidate (CPC) array. Data blocks within the data string are defined by the cutting points. The cutting points for the data blocks are defined by the index of the sliding window when the calculated hash value for the data encompassed by the sliding window matches the value of an element in a cut point candidate (CPC) array. In response to defining the index of the sliding window as the cutting point for the data block, the method 300 includes positioning the sliding window the associated step length (e.g., associated with the data type, application type, storage requirements, etc.) from the first edge of the sliding window and repeating the calculating and determining operations sequentially until the sliding window encompasses the end of the string of data.

Operation 304 includes calculating a hash value using a rolling hash function for data encompassed by the sliding window. The hash value of the data encompassed by the sliding window may be computed in any manner known in the art.

In a preferred embodiment, the hash value is calculated using a mod hash of the data within the sliding window. To calculate the modulus, l may refer to the step length, s may refer to the system chunk size, hash may refer to the hash value of the data encompassed in the sliding window, and hash' may refer to the value of using the module operator with the hash. The mod may be calculated as mod=s/l and hash' may be calculated as hash'=hash % mod. The mod hash value may be used to determine cutting points for data blocks which are substantially similar in size to the predefined fixed chunk size and/or within a predefined threshold of predefined fixed chunk size.

Operation 306 includes comparing the calculated hash value for the data encompassed by the sliding window to the value of the first element in a CPC array. In a preferred embodiment, each element in the CPC array is assigned a priority. In some approaches, the initial priority order of the elements in the CPC array may be determined by the user, the content provider, the service provider, the manufacturer, a default setting, the application, randomly assigned, etc. In preferred approaches, the priority order is determined based on historical data chunking implementations according to the various operations of method 300 as described herein. In one embodiment, the elements and/or priority of the elements of a CPC array are found in a look-up table.

In a preferred embodiment, the calculated hash value is compared to the value of the first element of the CPC array to determine whether the calculated hash value is equal to the value of the first element of the CPC array.

According to operation 308, in response to the calculated hash value being equal to the value of the first element in the CPC array, the index of the sliding window may define the cutting point for a data block. In response to defining a cutting point for a data block, the sliding window may be positioned at least one step length along the data from the cutting point. The method 300 may continue reading the data and reiterating through the various operations until all the data has been read and/or chunked into data blocks.

In preferred embodiments, in response defining a cutting point for a data block, wherein the data block is substantially similar in size to the predefined fixed chunk size and/or within a predefined threshold of the predefined fixed chunk size, the priority of the corresponding element in the CPC array may be increased relative to other elements in the CPC array. For example, if the third element in the CPC array is used to define a cutting point for a data block which is within 5 bits of the predefined fixed chunk size, the priority of the third element may be increased to replace the first element in the CPC array and the sequential elements are shifted to lower priorities accordingly as would be understood by one having ordinary skill in the art upon reading the present disclosure.

Operation 310 includes, in response to the calculated hash value being greater than the value of the first element in the CPC array, iteratively comparing the calculated hash value for the data encompassed by the sliding window to the sequential elements in the CPC array. In a preferred approach, the calculated hash value is compared to each element according to decreasing priority until the calculated hash value is equal to a value in the CPC array. For example, the calculated hash value may be compared to the first element in the CPC array, the second element in the CPC array, the third element in the CPC array, etc.

Operation 312 includes, in response to the calculated hash value being equal to the value of an element in the CPC array, the index of the sliding window may define the cutting point for the data block. In response to defining a cutting point for a data block, the sliding window may be positioned at least one step length along the data from the cutting point. The method 300 may continue reading the data and reiterating through the various operations until all the data has been read and/or chunked into data blocks.

Operation 314 includes, in response to the calculated hash value being less than the value of the first element in the CPC array, storing the calculated hash value to a temporary hash value array. The temporary hash value array may be interchangeably referred to as a temporary sliding value (TSV) array throughout the present disclosure. In various approaches, the TSV array stores the address of the corresponding hash value, the index of the sliding window associated with the hash value, the value of the calculated hash value, etc. The TSV array may store the address of the corresponding hash value, the index of the sliding window associated with the hash value, the value of the calculated hash value, etc., in any manner known in the art. In a preferred embodiment, the TSV array may store the address of the corresponding hash value, the index of the sliding window associated with the hash value, the value of the calculated hash value, etc., in a table.

Operation 316 includes positioning the sliding window. In a preferred embodiment, operation 316 includes positioning the sliding window at least one step length from the current location of the first edge of the sliding window, the previous cutting point, etc. In one approach, to determine an initial cutting point the sliding window may be positioned at least one step length from the beginning of the data.

In one embodiment, in response to the sliding window passing over an amount of data in the string of data that is greater than the predefined fixed chunk size, the method 300 may compare any stored calculated hash values according to operation 322 to be described in detail below.

Operation 318 includes calculating a subsequent hash value using the rolling hash function for data encompassed by the sliding window. The hash value of the data encompassed by the sliding window may be computed in any manner known in the art. In a preferred embodiment, calculating the hash value includes calculating a modified hash value.

Operation 320 includes comparing the subsequent calculated hash value for the data encompassed by the sliding window to the value of the first element in a CPC array.

In response to a subsequent calculated hash value being equal to the value of the first element in the CPC array, the index of the sliding window may define the cutting point for a data block. In response to defining a cutting point for a data block, the sliding window may be positioned at least one step length along the data from the cutting point. The method 300 may continue reading the data and reiterating through the various operations until all the data has been read and/or chunked into data blocks.

According to operation 322, in response to a subsequent calculated hash value being greater than the value of the first element in the CPC array, the stored calculated hash values (e.g., historical hash values stored to the TSV array) may be compared to the sequential elements in the CPC array. For example, each stored calculated hash value may be compared to the first element in the CPC array, each stored calculated hash value may be compared to the second element in the CPC array, each stored calculated hash value may be compared to the third element in the CPC array, etc., until a stored calculated hash is equal to a value of an element in the CPC array. In response to a stored calculated hash being equal to a value of an element in the CPC array, the method 300 may reiterate to operation 312.

In response to a subsequent calculated hash value being less than the value of the first element in the CPC array, the method 300 may reiterate through operations 314-320 until a subsequent calculated hash value is equal to an element in the CPC array. The subsequent calculated hash value may be stored to the temporary hash value array and the sliding window may be positioned at least one step length away from the previous location of the first edge of the sliding window, the previous cutting point, etc. Hash values may be calculated and compared to elements in the CPC array until a calculated hash value is equal to an element in the CPC array. In response to a calculated hash being equal to a value of an element in the CPC array, the method 300 may reiterate to operation 308 and/or operation 312.

In a preferred embodiment, various operations of method 300 reiterate until all the data is chunked into data blocks. The data blocks are preferably substantially similar to the predefined fixed chunk size and/or within a predefined threshold of the predefined fixed chunk size. The data blocks may be deduplicated in any manner known in the art.

The remaining non-deduplicated data blocks may comprise variable-sized data blocks. The variable-sized data blocks may be grouped for storage such that each group is substantially similar in size to the predefined fixed chunk size. The variable-seized data blocks may be grouped into groups (e.g. buckets, to be discussed in further detail below) which may be used for data compression technologies or any technology which uses fixed-size data chunks. In a preferred approach, any remaining non-deduplicated data blocks are sorted into descending order according to size of the data blocks.

The storage system for storing the data blocks may divide available storage into buckets for storing the data blocks. In a preferred embodiment, the size of the buckets is the predefined fixed chunk size. A number of buckets may be determined by the following equation:

$$N = \frac{\sum_{1}^{n} s_i(x)}{s}$$ Equation 1 where $s_i$ is the size of the non-deduplicated data blocks, s is the predefined fixed chunk size, and N is the number of buckets.

The non-deduplicated data blocks may be traversed and stored in each bucket in descending order. For example, the largest non-deduplicated data block may be sorted into a first bucket, the second largest non-deduplicated data block may be sorted into a second bucket, and so on until each bucket comprises at least one data block. In some approaches, an offset (e.g., the size of the data block within the bucket) may be recorded.

In a preferred embodiment, any remaining unsorted non-deduplicated data blocks may be sorted in the buckets in reverse order. For example, the smallest remaining data block may be sorted into the first bucket, the second smallest remaining data block may be sorted into the second bucket, etc. In one embodiment, if there are any remaining unsorted non-deduplicated data blocks, the sorting may be reiterated until all the non-deduplicated data blocks are fit into a bucket for storage thereby maximizing the capacity of the N buckets.

In another embodiment, if there are remaining unsorted non-deduplicated data blocks which do not fit in the allocated number of buckets, an additional number of buckets may be calculated and allocated by a storage system. The sorting may be reiterated until all the non-deduplicated data blocks are fit into a bucket for storage. The buckets comprising the data blocks may be stored in any manner known in the art.

Figure 4A:
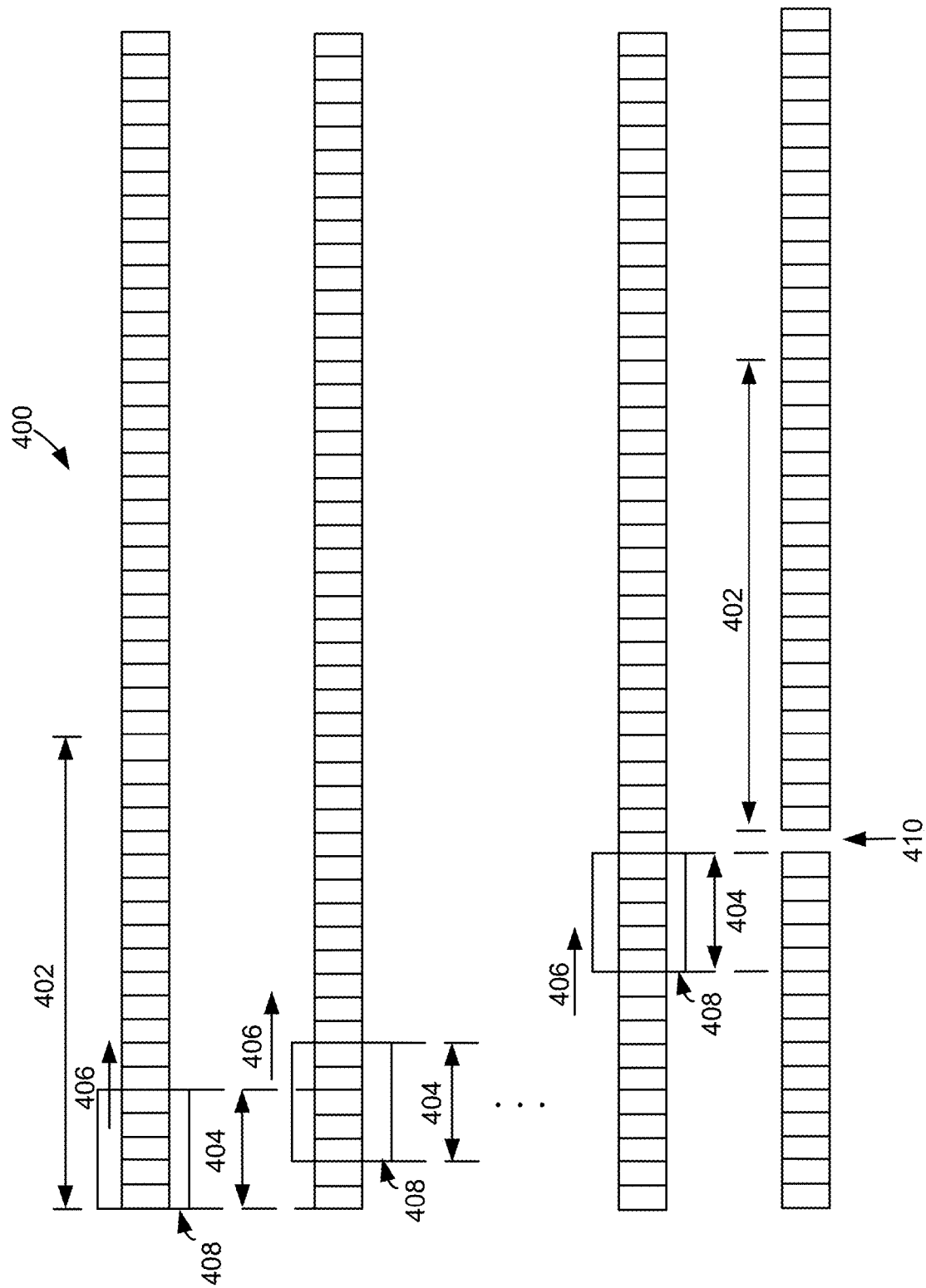
FIG. 4A is an exemplary implementation of the method of FIG. 3 in accordance with one embodiment of the present invention.

FIG. 4A is an exemplary implementation of the various operations of FIG. 3, in accordance with various embodiments. The implementation 400 may be implemented in accordance with the present invention in any of the environments depicted in FIGS. 1-3 and 4B-5, among others, in various embodiments. Of course, more or less elements than those specifically described in FIG. 4A may be included in implementation 400, as would be understood by one of skill in the art upon reading the present descriptions.

Each of the steps of the method 300 may be performed in the implementation 400. A processor, e.g., processing circuit(s), chip(s), and/or module(s) implemented in hardware and/or software, and preferably having at least one hardware component may be utilized in any device to perform one or more steps of the method 300 in the implementation 400. Illustrative processors include, but are not limited to, a central processing unit (CPU), an application specific integrated circuit (ASIC), a field programmable gate array (FPGA), etc., combinations thereof, or any other suitable computing device known in the art.

Exemplary implementation 400 includes a predefined fixed chunk size 402. The predefined fixed chunk size 402 may be based on the storage system used to store the data, the type of data, an application associated with the data, etc. The predefined fixed chunk size 402 may be determined by a user, a manufacturer, a content provider, a service provider, a default setting, etc. Any predetermined value disclosed herein may be found in a look-up table.

The sliding window 404, as shown, is initially positioned at the beginning of the data. The sliding window 404 is configured to be iterative positioned in step length 406 increments along the data from a first edge 408 of the sliding window 404.

A hash value for the data encompassed in the sliding window 404 may be calculated and compared to a first element in a CPC array. For example, a mod hash value may be calculated and compared to a first element, A[1].

If the value of the mod hash and the value of the first element are not equal, the index of the sliding window 404 and the calculated hash value may be recorded to a TSV array. The sliding window 404 may be positioned a step length 406 from the first edge 408 of the sliding window 404. The hash value may be calculated for every position of the sliding window 404 as the sliding window 404 is positioned a step length 406 from the first edge 408 of the sliding window 404 along the data. The hash value is compared to the first element of the CPC array until the sliding window reaches the end of the data, a hash value is equal to the first element of the CPC array, a hash value is greater than the first element in the CPC array, etc. As shown, the hash value for data encompassed by the sliding window 404 equals the first element in the CPC array at cutting point 410. In response to a calculated hash value being equal to the value of the first element in the CPC array, the index of the sliding window 404 may define the cutting point 410 for a data block. In response to defining a cutting point 410 for a data block, the sliding window 404 may be positioned at least one step length 406 along the data from the cutting point 410.

FIG. 4B is an exemplary implementation of the various operations of FIG. 3, in accordance with various embodiments. The implementation 400 may be implemented in accordance with the present invention in any of the environments depicted in FIGS. 1-4A and 5, among others, in various embodiments. Of course, more or less elements than those specifically described in FIG. 4B may be included in implementation 400, as would be understood by one of skill in the art upon reading the present descriptions.

Each of the steps of the method 300 may be performed in the implementation 400. A processor, e.g., processing circuit(s), chip(s), and/or module(s) implemented in hardware and/or software, and preferably having at least one hardware component may be utilized in any device to perform one or more steps of the method 300 in the implementation 400. Illustrative processors include, but are not limited to, a central processing unit (CPU), an application specific integrated circuit (ASIC), a field programmable gate array (FPGA), etc., combinations thereof, or any other suitable computing device known in the art.

Exemplary implementation 400 includes a predefined fixed chunk size 402. The predefined fixed chunk size 402 may be based on the storage system used to store the data, the type of data, an application associated with the data, etc. The predefined fixed chunk size 402 may be determined by a user, a manufacturer, a content provider, a service provider, a default setting, etc. Any predetermined value disclosed herein may be found in a look-up table.

The sliding window 404 is configured to be iterative positioned in step length 406 increments along the data from a first edge 408 of the sliding window 404.

In response to a hash value being equal to the value of the first element in the CPC array, the index of the sliding window 404 may define the cutting point 410 for a data block. In response to defining a cutting point 410 for a data block, the sliding window 404 may be positioned at least one step length 406 along the data from the cutting point 410.

As shown, the sliding window 404 has traversed a string of data larger than the predefined fixed chunk size 402 without determining that a calculated hash value for data encompassed by the sliding window 404 is equal to a first element in the CPC array. Each calculated hash value which is less than the first element in the CPC array is stored in a TSV array. The stored calculated hash values may be iteratively compared to the sequential elements in the CPC array. For example, each stored calculated hash value may be compared to the first element in the CPC array, each stored calculated hash value may be compared to the second element in the CPC array, each stored calculated hash value may be compared to the third element in the CPC array, etc., until a stored calculated hash is equal to a value of an element in the CPC array. In response to a stored calculated hash being equal to a value of an element in the CPC array, the cutting point 410 may be defined by the index of the sliding window 404 associated with the matching element. The indexes of the sliding window 404 and associated hash values are preferably stored in the TSV array.

Figure 5:
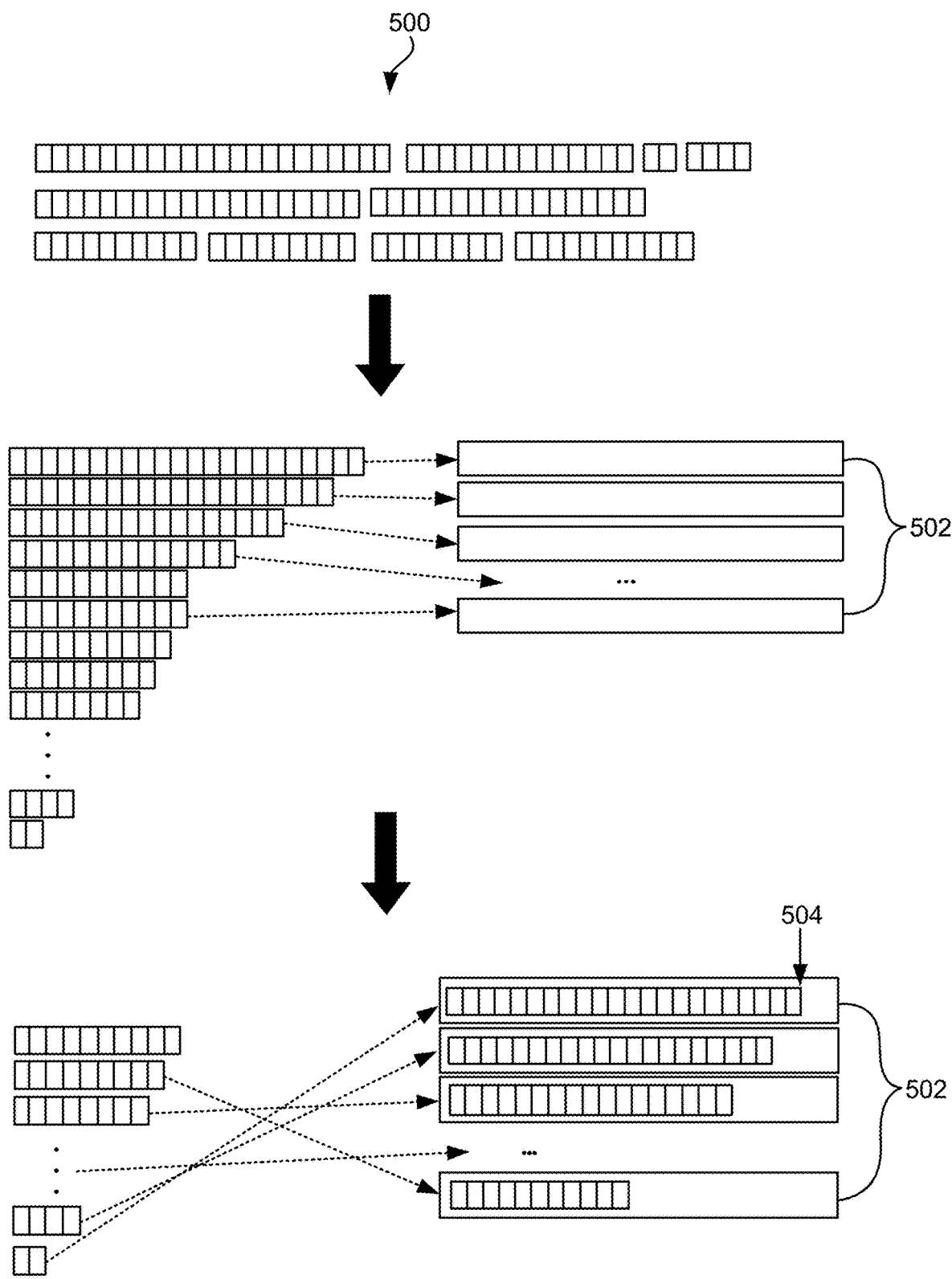
FIG. 5 is an exemplary storage implementation in accordance with one embodiment of the present invention.

FIG. 5 depicts an exemplary storage implementation 500, in accordance with one embodiment. As an option, the present storage implementation 500 may be implemented in conjunction with features from any other embodiment listed herein, such as those described with reference to the other FIGS. Of course, however, such storage implementation 500 and others presented herein may be used in various applications and/or in permutations which may or may not be specifically described in the illustrative embodiments listed herein. Further, the storage implementation 500 presented herein may be used in any desired environment.

In a preferred embodiment, various operations of method 300 reiterate until all the data is chunked into data blocks. The data blocks are preferably substantially similar to the predefined fixed chunk size and/or within a predefined threshold of the predefined fixed chunk size. The data blocks may be deduplicated in any manner known in the art.

As shown, any remaining non-deduplicated data blocks are sorted into descending order.

The storage system for storing the data blocks may divide storage into buckets 502 for storing the data blocks. In a preferred embodiment, the size of the buckets 502 is the predefined fixed chunk size. A number of buckets 502 may be determined using Equation 1 (e.g., discussed above) where $s_i$ is the size of the non-deduplicated data blocks, s is the predefined fixed chunk size, and N is the number of buckets 502.

The non-deduplicated data blocks may be traversed and stored in each bucket 502 in descending order. As shown, the largest non-deduplicated data block may be sorted into a first bucket, the second largest non-deduplicated data block may be sorted into a second bucket, and so on until each bucket comprises at least one data block. In some approaches, an offset 504 (e.g., the size of the data block within the bucket) may be recorded.

In a preferred embodiment, any remaining unsorted non-deduplicated data blocks may be sorted in the buckets 502 in reverse order. As shown, the smallest remaining data block may be sorted into the first bucket, the second smallest remaining data block may be sorted into the second bucket, etc. In one embodiment, if there are any remaining unsorted non-deduplicated data blocks, the sorting may be reiterated until all the non-deduplicated data blocks are fit into a bucket 502 for storage thereby maximizing the capacity of the N buckets.

In another embodiment, if there are remaining unsorted non-deduplicated data blocks, an additional number of buckets may be calculated and allocated by a storage system. The sorting may be reiterated until all the non-deduplicated data blocks are fit into a bucket 502 for storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   positioning a sliding window over a string of data;
   calculating a hash value using a rolling hash function for data encompassed by the sliding window;

determining whether the calculated hash value for the data encompassed by the sliding window matches the value of an element in a cut point candidate (CPC) array by:
comparing the calculated hash value to the value of a first element in the CPC array;
in response to the calculated hash value being equal to the value of the first element in the CPC array, defining an index of the sliding window as the cutting point for a data block;
in response to the calculated hash value being greater than the value of the first element in the CPC array, sequentially comparing the calculated hash value for the data encompassed by the sliding window to the sequential elements in the CPC array; and
in response to the calculated hash value being equal to the value of one of the sequential elements in the CPC array, defining the index of the sliding window as the cutting point for the data block;
in response to the calculated hash value being less than the value of the first element in the CPC array:
storing the calculated hash value to a temporary hash value array,
positioning the sliding window in a second position a step length from a first edge of the sliding window,
calculating a second hash value using the rolling hash function for data encompassed by the sliding window in the second position,
comparing the second hash value for the data encompassed by the sliding window to the value of the first element in the CPC array,
in response to the second calculated hash value being equal to the value of the first element in the CPC array, defining the index of the sliding window as the cutting point for the data block; and
in response to defining the index of the sliding window as the cutting point for the data block, positioning the sliding window the step length from the first edge of the sliding window and repeating the calculating and determining operations sequentially until the sliding window encompasses the end of the string of data, wherein the data blocks are defined by the cutting points.

2. The method of claim 1, comprising, in response to the second hash value being less than the value of the first element in the CPC array, performing the following process:
storing the second hash value to a temporary hash value array;
positioning the sliding window in a subsequent position the step length from the first edge of the sliding window;
calculating a subsequent hash value using the rolling hash function for data encompassed by the sliding window in the subsequent position;
comparing the calculated hash value for the data encompassed by the sliding window to the value of the first element in the CPC array until a subsequent hash value is equal to or greater than the value of the first element in the CPC array;
in response to a subsequent calculated hash value being equal to the value of the first element in the CPC array, defining the index of the sliding window as the cutting point for the data block;
in response to all calculated hash values being greater than the value of the first element in the CPC array, sequentially comparing the stored calculated hash values to sequential elements in the CPC array;
in response to determining a stored calculated hash value is equal to the value of one of the sequential elements in the CPC array, defining the index of the sliding window as the cutting point for the data block; and
in response to defining the index of the sliding window as the cutting point for the data block, positioning the sliding window the step length from the first edge of the sliding window and repeating the process until the sliding window encompasses the end of the string of data, wherein the data blocks are defined by the cutting points.

3. The computer-implemented method of claim 1, comprising:
deduplicating the data blocks;
sorting the data blocks in descending order;
determining a N number of buckets by dividing a sum of the sizes of the non- deduplicated blocks by the predefined fixed chunk size;
sequentially storing each data block in a unique bucket in descending order of data block size starting with the largest data block until each of the N buckets comprises at least one data block; and
in response to each of the N buckets comprising at least one data block, sequentially storing remaining data blocks in the N buckets in ascending order of the data block size starting with the smallest data block stored in the bucket having the largest data block, thereby maximizing the capacity of the N buckets.

4. The computer-implemented method of claim 1, wherein the size of the sliding window is based on the data type of the string of data.

5. The computer-implemented method of claim 1, wherein a priority order of elements in the CPC array is updated in response to a calculated hash value being equal to the value of the element in the CPC array, wherein an initial priority order is determined based on historical data chunking.

6. The computer-implemented method of claim 1, wherein the hash value is calculated using a mod hash of the data encompassed within the sliding window.

7. The computer-implemented method of claim 1, comprising, in response to defining the cutting point, positioning the sliding window the step length from the cutting point.

8. The computer-implemented method of claim 1, wherein the elements in the CPC array are based on a predefined fixed chunk size.

9. The computer-implemented method of claim 8, wherein the predefined fixed chunk size is based on the data type of the string of data.

10. The computer-implemented method of claim 8, wherein the size of the data blocks in a predefined threshold of the predefined fixed chunk size.

11. The computer-implemented method of claim 3, wherein the size of the N number of buckets is substantially similar in size compared to the predefined fixed chunk size.

12. A computer program product for defining data blocks within a string of data, the computer program product comprising a computer readable storage medium having program instructions embodied therewith, the program instructions executable by a computer to cause the computer to:
position, by the computer, a sliding window over a string of data;
calculate, by the computer, a hash value using a rolling hash function for data encompassed by the sliding window;

determine, by the computer, whether the calculated hash value for the data encompassed by the sliding window matches the value of an element in a cut point candidate (CPC) array by:
compare, by the computer, the calculated hash value to the value of a first element in the CPC array;
in response to the calculated hash value being equal to the value of the first element in the CPC array, define, by the computer, an index of the sliding window as the cutting point for a data block;
in response to the calculated hash value being greater than the value of the first element in the CPC array, sequentially compare, by the computer, the calculated hash value for the data encompassed by the sliding window to the sequential elements in the CPC array; and
in response to the calculated hash value being equal to the value of one of the sequential elements in the CPC array, define, by the computer, the index of the sliding window as the cutting point for the data block;
in response to the calculated hash value being less than the value of the first element in the CPC array:
store, by the computer, the calculated hash value to a temporary hash value array,
position, by the computer, the sliding window in a second position a step length from a first edge of the sliding window,
calculate, by the computer, a second hash value using the rolling hash function for data encompassed by the sliding window in the second position,
compare, by the computer, the second hash value for the data encompassed by the sliding window to the value of the first element in the CPC array,
in response to the second calculated hash value being equal to the value of the first element in the CPC array, define, by the computer, the index of the sliding window as the cutting point for the data block; and
in response to defining the index of the sliding window as the cutting point for the data block, position, by the computer, the sliding window the step length from the first edge of the sliding window and repeat, by the computer, the calculating and determining operations sequentially until the sliding window encompasses the end of the string of data, wherein the data blocks are defined by the cutting points.

13. The computer program product of claim 12, comprising program instructions to cause the computer to, in response to the second hash value being less than the value of the first element in the CPC array, perform the following process:
store, by the computer, the second hash value to a temporary hash value array;
position, by the computer, the sliding window in a subsequent position the step length from the first edge of the sliding window;
calculate, by the computer, a subsequent hash value using the rolling hash function for data encompassed by the sliding window in the subsequent position; and
compare, by the computer, the calculated hash value for the data encompassed by the sliding window to the value of the first element in the CPC array until a subsequent hash value is equal to or greater than the value of the first element in the CPC array;
in response to a subsequent calculated hash value being equal to the value of the first element in the CPC array, define, by the computer, the index of the sliding window as the cutting point for the data block;
in response to all calculated hash values being greater than the value of the first element in the CPC array, sequentially compare, by the computer, the stored calculated hash values to sequential elements in the CPC array;
in response to determining a stored calculated hash value is equal to the value of one of the sequential elements in the CPC array, define, by the computer, the index of the sliding window as the cutting point for the data block; and
in response to defining the index of the sliding window as the cutting point for the data block, position, by the computer, the sliding window the step length from the first edge of the sliding window and repeat, by the computer, the process until the sliding window encompasses the end of the string of data, wherein the data blocks are defined by the cutting points.

14. The computer program product of claim 12, comprising program instructions to cause the computer to:
deduplicate, by the computer, the data blocks;
sort, by the computer, the data blocks in descending order;
determine, by the computer, a N number of buckets by dividing a sum of the sizes of the non-deduplicated blocks by the predefined fixed chunk size;
sequentially store, by the computer, each data block in a unique bucket in descending order of data block size starting with the largest data block until each of the N buckets comprises at least one data block; and
in response to each of the N buckets comprising at least one data block, sequentially store, by the computer, remaining data blocks in the N buckets in the ascending order of the data block size starting with the smallest data block stored in the bucket having the largest data block, thereby maximizing the capacity of the N buckets.

15. The computer program product of claim 12, wherein the size of the sliding window is based on the data type of the string of data.

16. The computer program product of claim 12, wherein a priority order of elements in the CPC array is updated in response to a calculated hash value being equal to the value of the element in the CPC array, wherein an initial priority order is determined based on historical data chunking.

17. The computer program product of claim 12, wherein the hash value is calculated using a mod hash of the data encompassed within the sliding window.

18. A system, comprising:
a processor; and
logic integrated with the processor, executable by the processor, or integrated with and executable by the processor, the logic being configured to:
position a sliding window over a string of data;
calculate a hash value using a rolling hash function for data encompassed by the sliding window;
determine whether the calculated hash value for the data encompassed by the sliding window matches the value of an element in a cut point candidate (CPC) array by:
compare the calculated hash value to the value of a first element in the CPC array;
in response to the calculated hash value being equal to the value of the first element in the CPC array, define an index of the sliding window as the cutting point for a data block;
in response to the calculated hash value being greater than the value of the first element in the CPC array, sequentially compare the calculated hash value for the data encompassed by the sliding window to the sequential elements in the CPC array; and in response to the calculated hash value being equal to the value of one of the sequential elements in the CPC array, define the index of the sliding window as the cutting point for the data block;

in response to the calculated hash value being less than the value of the first element in the CPC array:
   store the calculated hash value to a temporary hash value array,
   position the sliding window in a second position a step length from a first edge of the sliding window,
   calculate a second hash value using the rolling hash function for data encompassed by the sliding window in the second position,
   compare the second hash value for the data encompassed by the sliding window to the value of the first element in the CPC array,
      in response to the second calculated hash value being equal to the value of the first element in the CPC array, define the index of the sliding window as the cutting point for the data block; and in response to defining the index of the sliding window as the cutting point for the data block, position the sliding window the step length from the first edge of the sliding window and repeat the calculating and determining operations sequentially until the sliding window encompasses the end of the string of data, wherein the data blocks are defined by the cutting points.

19. The system of claim 18, comprising logic configured to: in response to the second hash value being less than the value of the first element in the CPC array, perform the following process:
   store the second hash value to a temporary hash value array;
   position the sliding window in a subsequent position the step length from the first edge of the sliding window;
   calculate a subsequent hash value using the rolling hash function for data encompassed by the sliding window in the subsequent position; and
   compare the calculated hash value for the data encompassed by the sliding window to the value of the first element in the CPC array until a subsequent hash value is equal to or greater than the value of the first element in the CPC array;
   in response to a subsequent calculated hash value being equal to the value of the first element in the CPC array, define the index of the sliding window as the cutting point for the data block;
   in response to all calculated hash values being greater than the value of the first element in the CPC array, sequentially compare the stored calculated hash values to sequential elements in the CPC array;
      in response to determining a stored calculated hash value is equal to the value of one of the sequential elements in the CPC array, define the index of the sliding window as the cutting point for the data block; and in response to defining the index of the sliding window as the cutting point for the data block, position the sliding window the step length from the first edge of the sliding window and repeat the process until the sliding window encompasses the end of the string of data, wherein the data blocks are defined by the cutting points.

20. The system of claim 18, comprising logic configured to:
   deduplicate the data blocks;
   sort the data blocks in descending order;
   determine a N number of buckets by dividing a sum of the sizes of the non-deduplicated blocks by the predefined fixed chunk size;
   sequentially store each data block in a unique bucket in descending order of data block size starting with the largest data block until each of the N buckets comprises at least one data block; and
   in response to each of the N buckets comprising at least one data block, sequentially store remaining data blocks in the N buckets in ascending order of the data block size starting with the smallest data block stored in the bucket having the largest data block, thereby maximizing the capacity of the N buckets.

* * * * *